(12) United States Patent
Kim

(10) Patent No.: US 6,958,760 B1
(45) Date of Patent: Oct. 25, 2005

(54) FALSE CONTOUR CORRECTION APPARATUS IN IMAGE DISPLAY SYSTEM AND FALSE CONTOUR CORRECTION METHOD

(75) Inventor: Young-Sun Kim, Suwon (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 495 days.

(21) Appl. No.: 09/705,929

(22) Filed: Nov. 6, 2000

(30) Foreign Application Priority Data

Nov. 6, 1999 (KR) ............................... 1999/49105
Nov. 2, 2000 (KR) ............................... 2000/65047

(51) Int. Cl.⁷ ............................................. G09G 5/02
(52) U.S. Cl. ......................... 345/697; 345/600; 349/9; 348/744
(58) Field of Search .................. 345/87–100, 690–692, 345/697–699, 6, 600; 349/63, 9, 117; 353/30–31, 353/34; 348/28, 607, 744

(56) References Cited

U.S. PATENT DOCUMENTS

| | | | |
|---|---|---|---|
| 4,574,636 A | 3/1986 | Satake | |
| 5,109,282 A | 4/1992 | Peli | |
| 5,706,063 A | 1/1998 | Hong | |
| 5,909,204 A * | 6/1999 | Gale et al. ..................... | 345/85 |
| 5,963,190 A | 10/1999 | Tsuboyama et al. | |
| 6,005,655 A * | 12/1999 | Mushiake et al. ............. | 355/31 |
| 6,018,329 A | 1/2000 | Kida et al. | |
| 6,025,818 A * | 2/2000 | Okano .......................... | 345/63 |
| 6,052,112 A | 4/2000 | Tanaka et al. | |
| 6,072,555 A | 6/2000 | Mizutome et al. | |
| 6,088,012 A | 7/2000 | Shigeta et al. | |
| 6,100,939 A | 8/2000 | Kougami et al. | |
| 6,134,025 A | 10/2000 | Takeuchi et al. | |
| 6,186,629 B1 * | 2/2001 | Iwamura et al. .............. | 353/31 |
| 6,191,826 B1 * | 2/2001 | Murakami et al. .......... | 348/744 |
| 6,661,469 B1 * | 12/2003 | Kawabata et al. .......... | 348/607 |

FOREIGN PATENT DOCUMENTS

| | | |
|---|---|---|
| EP | 0 838 799 A1 | 4/1998 |
| EP | 0 843 487 A1 | 5/1998 |
| JP | 08-168039 | 6/1996 |
| JP | 08-294138 | 11/1996 |
| JP | 09-90402 | 4/1997 |
| JP | 10-23445 | 1/1998 |
| JP | 10-123477 | 5/1998 |
| JP | 10-148885 | 6/1998 |
| JP | 10-198320 | * 7/1998 |
| JP | 11-6980 | 1/1999 |

* cited by examiner

Primary Examiner—Amr A. Awad
(74) Attorney, Agent, or Firm—Robert E. Bushnell, Esq.

(57) ABSTRACT

A false contour correction apparatus and method in an image display system, by which a false contour at a place where conversion of the unit bits of data is severe on a display device driven in a digital system is corrected, is provided. According to the present invention as described above, received image data is displayed by reversely-symmetrically arranging the bits of two digital driving display means, so that fatal false contour during digital driving can be removed.

44 Claims, 7 Drawing Sheets

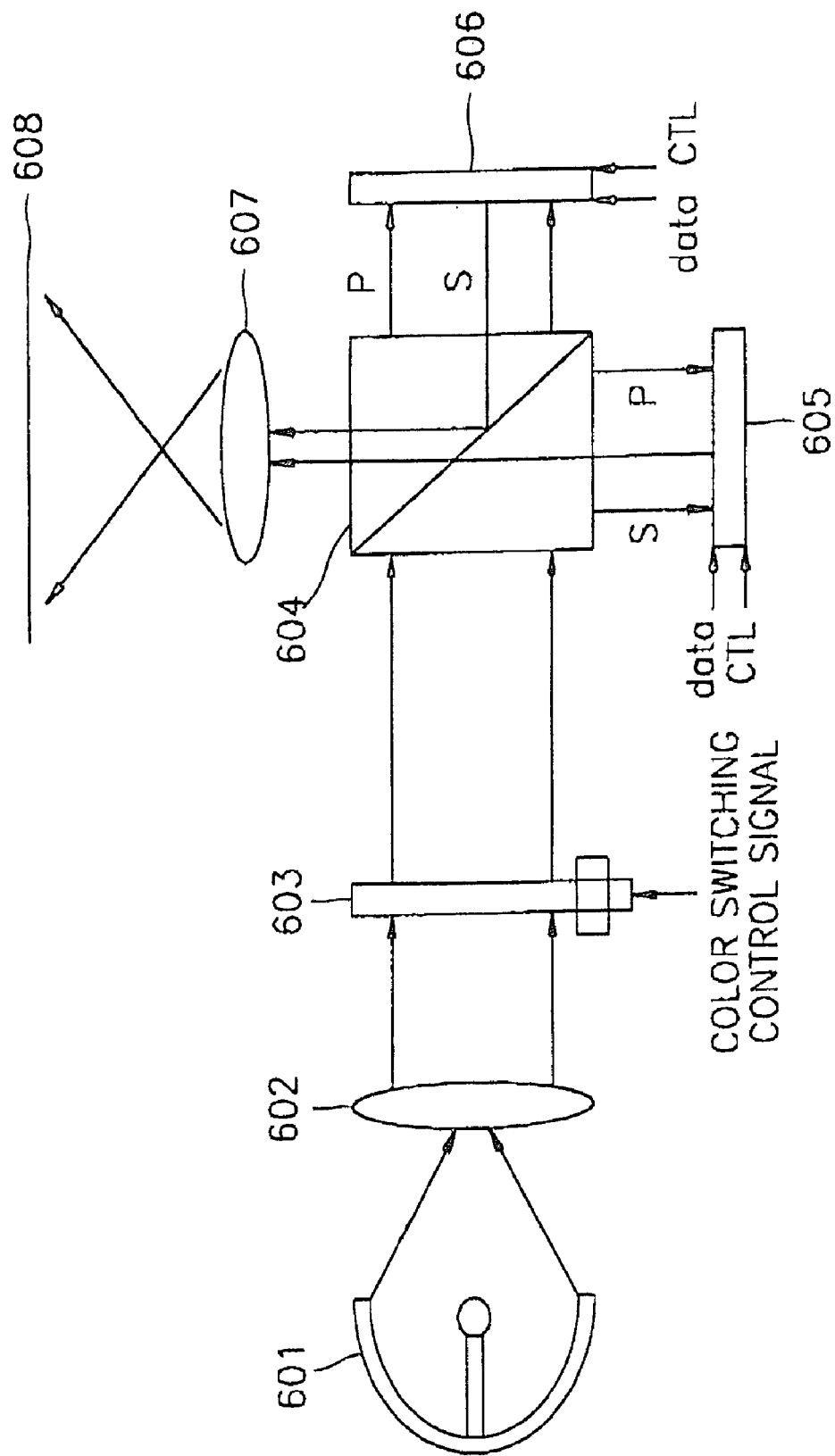

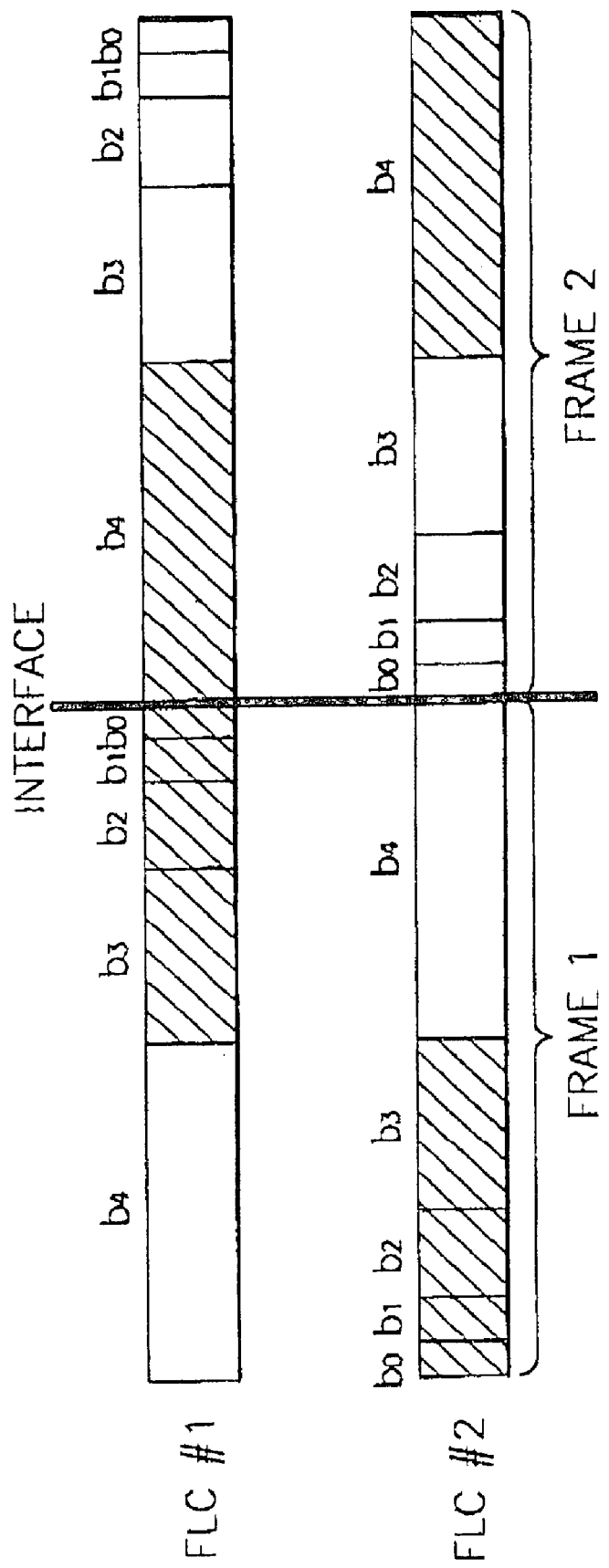

FALSE CONTOUR CORRECTION APPARATUS IN IMAGE DISPLAY SYSTEM AND FALSE CONTOUR CORRECTION METHOD

CLAIM OF PRIORITY

This application makes reference to, incorporates the same herein, and claims all benefits accruing under 35 U.S.C. § 119 from an application entitled False Contour Correction Apparatus in Image Display System and False Contour Correction Method earlier filed in the Korean Industrial Property Office on 6 Nov. 1999, and there duly assigned Serial No. 49105/1999, and an application entitled False Contour Correction Apparatus in Image Display System and False Contour Correction Method earlier filed in the Korean Industrial Property Office on 2 Nov. 2000, and there duly assigned Serial No. 65047/2000.

BACKGROUND OF THE INVENTION

1. Technical Field

The present invention relates to an image display device and method, and more particularly, to a false contour correction apparatus in an image display system, by which a false contour at a place where conversion of the unit bits of data is severe on a display device driven in a digital system can be corrected.

2. Related Art

Existing types of display devices driven in a digital system include a plasma display panel (PDP), a liquid crystal display (LCD) panel, a ferroelectric liquid crystal (FLC) panel, and the like.

FLC panels have a structure in which ferroelectric liquid crystal is sandwiched between an optical planar mirror formed on a silicon substrate and glass, and have a wide viewing angle and a fast response speed compared to other panels.

In a display device driven in a digital system, distortion of picture due to an optical illusion, which is referred to as a false contour, usually occurs at a place where conversion of the unit bits of data is severe.

In a display apparatus driven in a digital system, a false contour having serious bit conversion is generated on a changing picture, for example, at the gentle boundary where a data value is changed from 63 to 64 and from 127 to 128. That is, even when a data value is change just by one, for example, from 127 to 128, if a picture changes, data of 225 or 0 is perceived at the boundary according to the direction of the movement of the picture, resulting in a fatal degradation in the quality of image.

I have found that an image can be degraded to an undesirable level due to the false contour phenomenon. Efforts have been made to reduce false contouring and improve image display systems.

Exemplars of recent efforts in the art include U.S. Pat. No. 6,072,555 to Mizutome et al., entitled DISPLAY APPARATUS CAPABLE OF GRADATIONAL DISPLAY, issued on Jun. 6, 2000, U.S. Pat. No. 5,963,190 to Tsuboyama et al., entitled DRIVING METHOD FOR DISPLAY DEVICE AND DISPLAY APPARATUS, issued on Oct. 5, 1999, U.S. Pat. No. 6,088,012 to Shigeta et al., entitled HALF TONE DISPLAY METHOD FOR A DISPLAY PANEL, issued on Jul. 11, 2000, U.S. Pat. No. 6,052,112 to Tanaka et al., entitled GRADATION DISPLAY SYSTEM, issued on Apr. 18, 2000, U.S. Pat. No. 5,109,282 to Peli, entitled HALFTONE IMAGING METHOD AND APPARATUS UTILIZING PYRAMIDOL ERROR CONVERGENCE, issued on Apr. 28, 1992, U.S. Pat. No. 6,100,939 to Kougami et al., entitled TONE DISPLAY METHOD AND APPARATUS FOR DISPLAYING IMAGE SIGNAL, issued on Aug. 8, 2000, U.S. Pat. No. 6,018,329 to Kida et al., entitled DRIVING SYSTEM FOR A PLASMA DISPLAY PANEL, issued on Jan. 25, 2000, U.S. Pat. No. 4,574,636 to Satake, entitled APPARATUS FOR EXAMINING AN OBJECT BY USING ULTRASONIC BEAMS, issued on Mar. 11, 1986, U.S. Pat. No. 6,134,025 to Takeuchi et al, entitled DOT IMAGE DATA OUTPUT APPARATUS, issued on Oct. 17, 2000, U.S. Pat. No. 5,706,063 to Hong, entitled OPTICAL SYSTEM OF A REFLECTION LCD PROJECTOR, issued on Jan. 6, 1998; Japanese Patent No. 11-6980 to Miyashita, entitled PROJECTION DEVICE, published on Jan. 12, 1999, Japanese Patent No. 8-168039 too Nomura et al., entitled PROJECTION DISPLAY SYSTEM AND PROJECTION POSITION ADJUSTING METHOD, published on 25 Jun. 1996, Japanese Patent No. 09-90402 to Takigawa et al., entitled PICTURE DISPLAY DEVICE, published on 4 Apr. 1997, Japanese Patent No. 10-123477 to Yoneda et al., entitled LIQUID CRYSTAL PROJECTOR, published on 15 May 1998, Japanese Patent No. 10-23445 to Semasa, entitled PICTURE DISPLAY DEVICE, published on 23 Jan. 1998, Japanese Patent No. 08-294138 to Ozuru et al., entitled LIQUID CRYSTAL PROJECTOR, published on 5 Nov. 1996, and Japanese Patent No. 10-148885 to Murakami et al., entitled PROJECTOR APPARATUS, issued on 2 Jun. 1998.

While these recent efforts provide advantages, I note that they fail to adequately provide a false contour correction apparatus and method in an image display system.

SUMMARY OF THE INVENTION

To solve the above problems and others, an objective of the present invention is to provide a false contour correction apparatus in an image display system, by which a false contour is corrected by reversely symmetrically arranging the bits of two digital display panels, which are driven in a digital system, so that one digital display panel displays data in the order from the most significant bit to the least significant bit while the other digital display panel displays data in the order from the least significant bit to the most significant bit.

To solve the above problems and others, an objective of the present invention is to provide a false contour correction method in an image display system, by which a false contour is corrected by reversely symmetrically arranging the bits of two digital display panels, which are driven in a digital system, so that one digital display panel displays data in the order from the most significant bit to the least significant bit while the other digital display panel displays data in the order from the least significant bit to the most significant bit.

To achieve these and other objects in accordance with the principles of the present invention, as embodied and broadly described, the present invention provides a false contour correction apparatus in an image display system driven in a digital system, the apparatus including: a controller for receiving R, G and B signals and outputting R, G and B data for driving two digital display panels by performing a predetermined signal processing, in accordance with a synchronization signal; and an optical engine for receiving R, G and B data from the controller and outputting image data to a screen via a first digital display panel for displaying data in a sequence from the most significant bit to the least significant bit and a second digital display panel for displaying data in a sequence from the least significant bit to the most significant bit.

To achieve these and other objects in accordance with the principles of the present invention, as embodied and broadly described, the present invention provides a false contour correcting method in an image display system for displaying received image data on two digital display panels, wherein the first digital display panel arranges the bits of the image data so that the image data is driven and displayed in the order from the most significant bit to the least significant bit, and the second digital display panel arranges the bits of the image data so that the image data is driven and displayed in the order from the least significant bit to the most significant bit.

To achieve these and other objects in accordance with the principles of the present invention, as embodied and broadly described, the present invention provides an image display apparatus correcting false contour, comprising: a first light beam splitter passing a first wavelength band of a plurality of colored lights received, reflecting a second wavelength band of said plurality of colored lights received; a first panel receiving said first wavelength band of said plurality of colored lights, receiving color data and panel control signals, outputting first incident light corresponding to said received color data in accordance with said panel control signals to display said received color data starting from most significant bit to least significant bit; and a second panel receiving said second wavelength band of said plurality of colored lights, receiving said color data and panel control signals, outputting second incident light corresponding to said received color data in accordance with said panel control signals to display said received color data starting from least significant bit to most significant bit.

To achieve these and other objects in accordance with the principles of the present invention, as embodied and broadly described, the present invention provides an image display apparatus, comprising: a control unit receiving color signals and synchronization signals, outputting color switch signals in accordance with said synchronization signals, outputting color data corresponding to said received color signals, outputting panel control signals; a light unit emitting white light; a color switching unit receiving the white light from said first lens, receiving said color switch signals from said control unit, separating the white light into a plurality of colored lights, outputting each one of said plurality of colored lights seriatim in response to said color switch signals; a first panel receiving P wavelength components of said plurality of colored lights outputted from said color switching unit, receiving said color data and panel control signals outputted by said control unit, outputting first incident light corresponding to said received color data applied by said control unit to data lines of each cell formed as a matrix in accordance with said panel control signals to display said received color data starting from most significant bit to least significant bit; and a second panel receiving S wavelength components of said plurality of colored lights outputted from said color switching unit, receiving said color data and panel control signals outputted by said control unit, outputting second incident light corresponding to said received color data applied by said control unit to data lines of each cell formed as a matrix in accordance with said panel control signals to display said received color data starting from least significant bit to most significant bit.

To achieve these and other objects in accordance with the principles of the present invention, as embodied and broadly described, the present invention provides an image display apparatus, comprising: a light unit emitting light; a color switching unit receiving the light from said light unit, receiving color switch signals, separating the light into a plurality of colored lights, outputting each one of said plurality of colored lights seriatim in response to said color switch signals; a light beam splitter passing a first wavelength band of said plurality of colored lights received from said color switching unit, reflecting a second wavelength band of said plurality of colored lights received from said color switching unit; a first panel receiving said first wavelength band of said plurality of colored lights, receiving color data and panel control signals, reflecting first incident light corresponding to said received color data applied to data lines of each cell formed as a matrix in accordance with said panel control signals to display said received color data starting from most significant bit to least significant bit; a second panel receiving said second wavelength band of said plurality of colored lights, receiving said color data and panel control signals, reflecting second incident light corresponding to said received color data applied to data lines of each cell formed as a matrix in accordance with said panel control signals to display said received color data starting from least significant bit to most significant bit; said light beam splitter receiving first and second reflected incident light from said first and second panels respectively, passing said first wavelength band of said second incident light reflected by said second panel, reflecting said second wavelength band of said first incident light reflected by said first panel; and a screen receiving said first wavelength band of light passed by said light beam splitter and said second wavelength band of light reflected by said light beam splitter.

To achieve these and other objects in accordance with the principles of the present invention, as embodied and broadly described, the present invention provides a method of displaying an image on an image display apparatus, comprising: emitting light from a light unit; receiving the light from said light unit and receiving color switch signals, separating the received light into a plurality of colored lights and outputting each one of said plurality of colored lights seriatim in accordance with said color switch signals, said separating being performed by a color switch unit; passing a first wavelength band of said plurality of colored lights outputted from said color switching unit and reflecting a second wavelength band of said plurality of colored lights outputted from said color switching unit; receiving said first wavelength band of said plurality of colored lights, receiving first color data and first panel control signals, transmitting first incident light corresponding to said received first color data in accordance with said first panel control signals to display said received first color data starting from most significant bit to least significant bit, said receiving of said first wavelength band being performed by a first panel; receiving said second wavelength band of said plurality of colored lights, receiving second color data and second panel control signals, transmitting second incident light corresponding to said received second color data in accordance with said second panel control signals to display said received second color data starting from least significant bit to most significant bit, said receiving of said second wavelength band being performed by a second panel; receiving first and second incident light from said first and second panels respectively, passing said second wavelength band of said second incident light transmitted by said second panel, reflecting said first wavelength band of said first incident light transmitted by said first panel; and receiving and displaying on a screen said second wavelength band of said second incident light transmitted and said first wavelength band of said first incident light reflected.

To achieve these and other objects in accordance with the principles of the present invention, as embodied and broadly described, the present invention provides a false contour correction apparatus in an image display system driven in a digital system, the apparatus comprising: a controller receiving a plurality of colored signals, performing a predetermined signal processing, and outputting color data in accordance with said signal processing; and an optical unit receiving said outputted color data, outputting image data corresponding to said outputted color data to a screen via a first light path by displaying data in a sequence from most significant bit to least significant bit and via a second light path by displaying data in a sequence from least significant bit to most significant bit.

To achieve these and other objects in accordance with the principles of the present invention, as embodied and broadly described, the present invention provides a false contour correcting method in an image display system, comprising: receiving image data and supplying said image data to a first display arranging bits of said image data so that said image data is driven and displayed in order from most significant bit to least significant bit; and supplying said image data to a second display arranging bits of said image data so that said image data is driven and displayed in order from least significant bit to most significant bit.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 6 is a detailed configuration of a second embodiment of the optical engine of FIG. 3, in accordance with the principles of the present invention; and FIG. 7 shows a displayed bit specification of LCD data to explain false contour correction, in accordance with the principles of the present invention.

DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
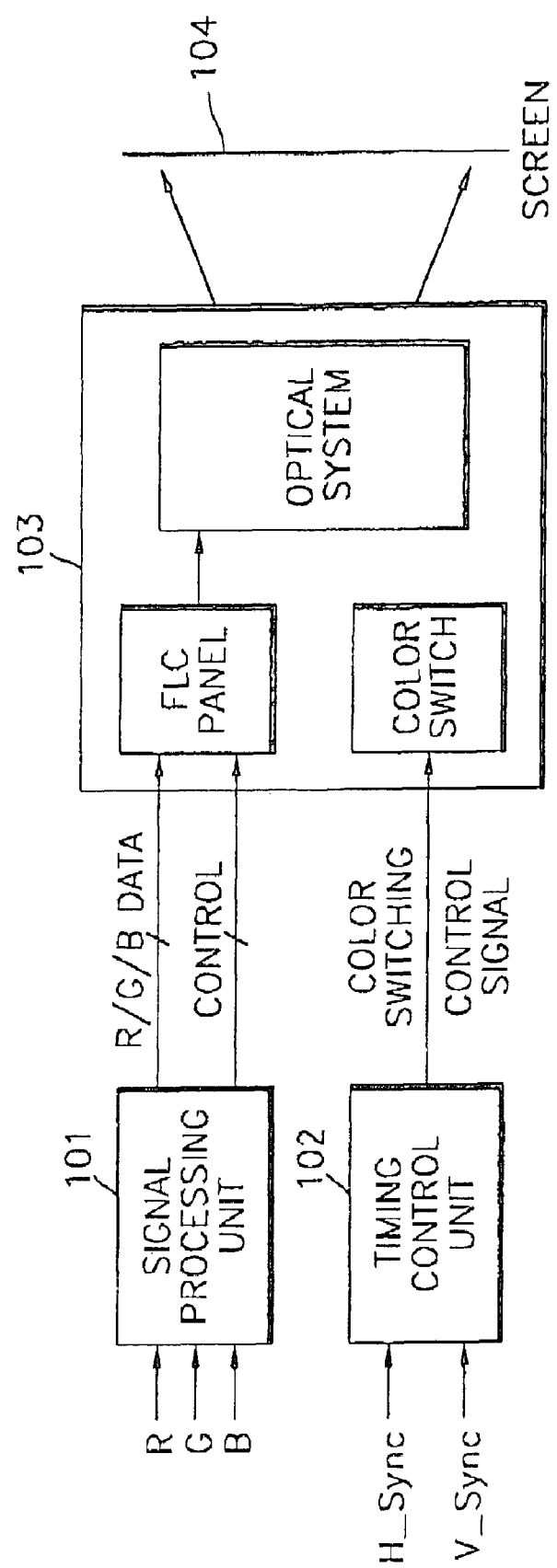
FIG. 1 is a block diagram illustrating the structure of a display device using a ferroelectric liquid crystal (FLC) panel.
Figure 2:
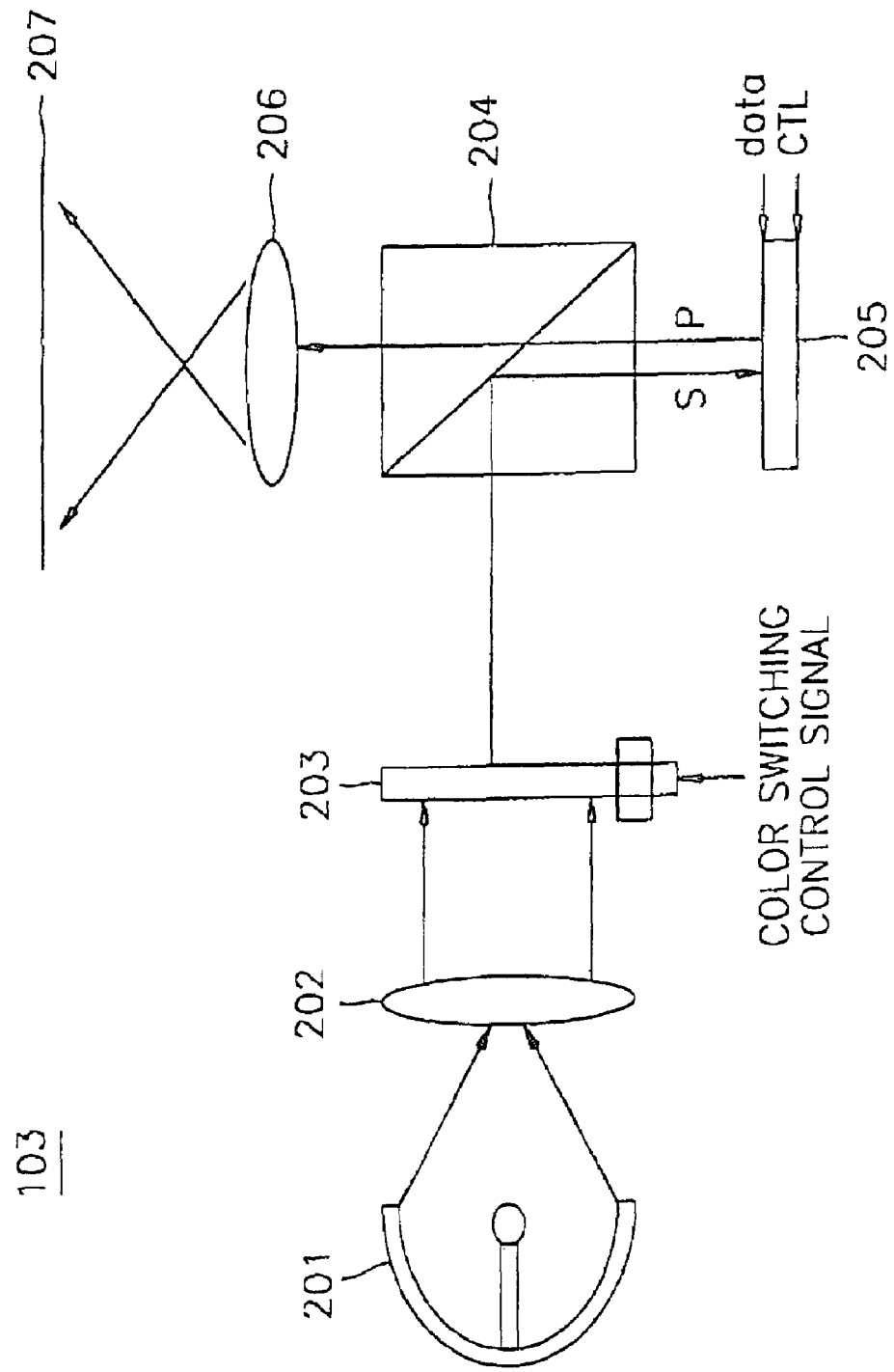
FIG. 2 is a detailed configuration view of the optical engine of FIG. 1.

As shown in FIG. 1, a display device using an FLC display panel is made up of a signal processing unit 101, a timing control unit 102, an optical engine 103 and a screen 104. As shown in FIG. 2, the optical engine 103 is made up of an optical source 201, a collimating lens 202, a color switching means 203, a polarized beam splitter 204, an FLC panel 205, and a projection lens 206.

The signal processing unit 101 receives R, G, and B (red, green, and blue) signals, controls the offset, contrast and brightness of the received signals, performs signal processing such as gamma correction, and then generates R/G/B data to be displayed on the FLC panel on a field-by-field basis in synchronization with a vertical synchronization signal and also generates a clock and panel control signal for controlling an FLC panel.

The timing control unit 102 receives a vertical synchronization signal and a horizontal synchronization signal, and generates a color switching control signal for controlling the color switching means 203.

The operation of displaying R/G/B data output from the signal processing unit 101 on the screen 104 will now be described with reference to FIG. 2. The optical source 201 is made up of a lamp for producing light, and a reflective mirror for reflecting light emitted from the lamp to guide the light, and radiates light.

The collimating lens 202 focuses light radiated from the optical source 201 into parallel light or focusing light. The color switching means 203 is an LCD shutter or a color wheel type, and receives white light from the collimating lens 202 and sequentially switches and outputs three colors R, G and B at intervals of a ⅓ vertical period during one vertical period according to a color switching control signal received from the timing control unit 102. That is, during the first ⅓ vertical period, only the wavelength of the color R among the received light is transmitted, while the remaining wavelengths are blocked. Then, the wavelength of each of the colors G and B is switched and transmitted during a ⅓ vertical period.

The polarized beam splitter 204 reflects an S wave among light received from the color switching means 203 and guides the reflected S wave to the FLC panel 205, and transmits a P wave. The FLC panel 205 reflects incident light to the polarized beam splitter 204 in accordance with the R/G/B data values applied by the signal processing unit 101 to the data lines of each cell formed as a matrix, under the control of a clock and panel control signal, thereby displaying the image of each pixel.

Then, the polarized beam splitter 204 transmits a P wave among light reflected by the FLC panel 205 and guides the P wave to the projection lens 206, and reflects an S wave. The projection lens 206 magnifies the light received from the polarized beam splitter 204 and projects the magnified light toward the screen 207.

Figure 3:
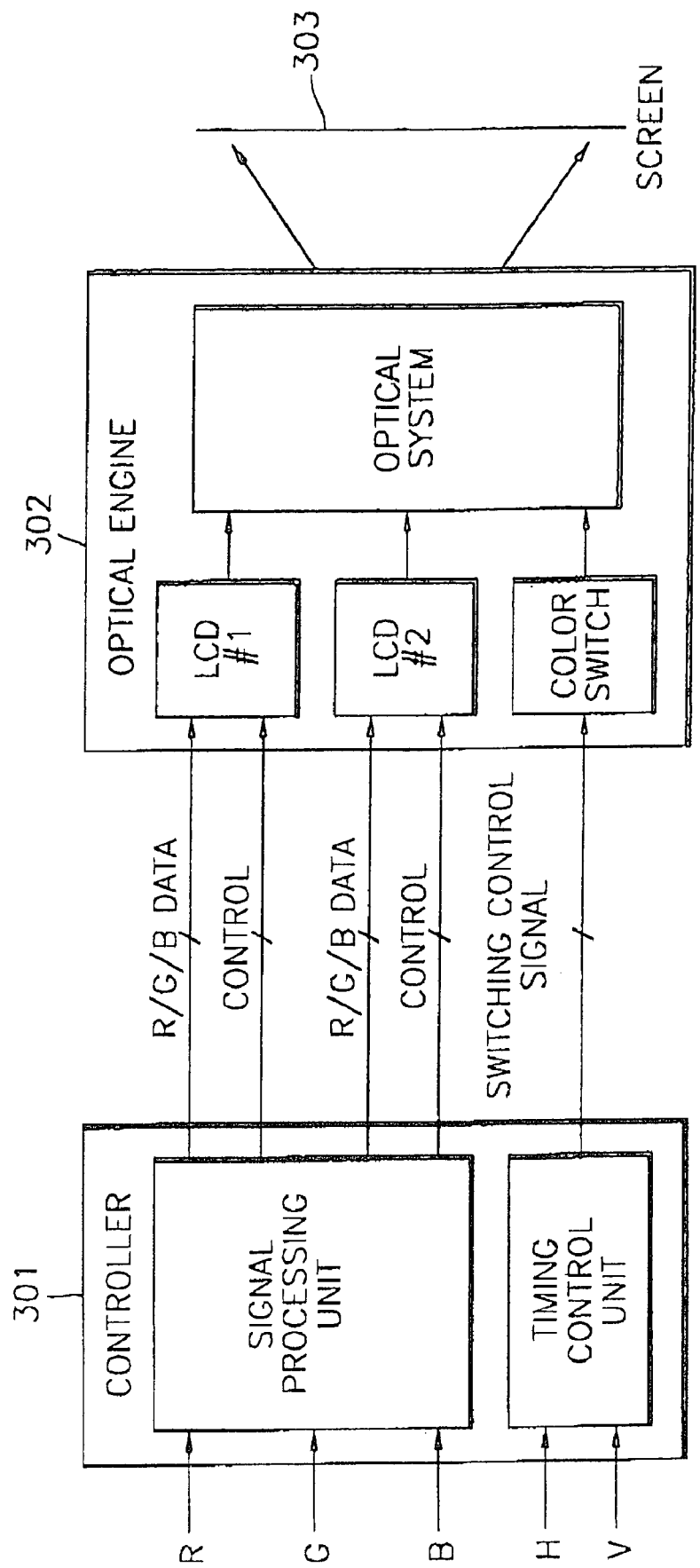
FIG. 3 is a block diagram illustrating the structure of a false contour correction apparatus in an image display system, in accordance with the principles of the present invention.

As shown in FIG. 3, a false contour correction apparatus in an image display system according to the present invention includes a controller 301, an optical engine 302 and a screen 303. In the controller 301, a signal processing unit receives R, G and B signals, controls the offset, the contrast and the brightness, performs signal processing such as gamma correction, and then outputs R/G/B data for driving two liquid crystal display (LCD) panels, in accordance with a vertical synchronization signal. Also, the signal processing unit generates control signals for driving LCD panels.

A timing control unit in the controller 301 generates a color switching control signal for controlling the R, G, B color switching of a color switching means included in the optical engine 302, in accordance with a synchronization signal. As described above, the R, G and B data output from the controller 301 is applied to the LCD panels of the optical engine 302, and the LCD panel transmits or reflects incident light R, G and B corresponding to the values of the R, G and B data to display images.

Figure 5:
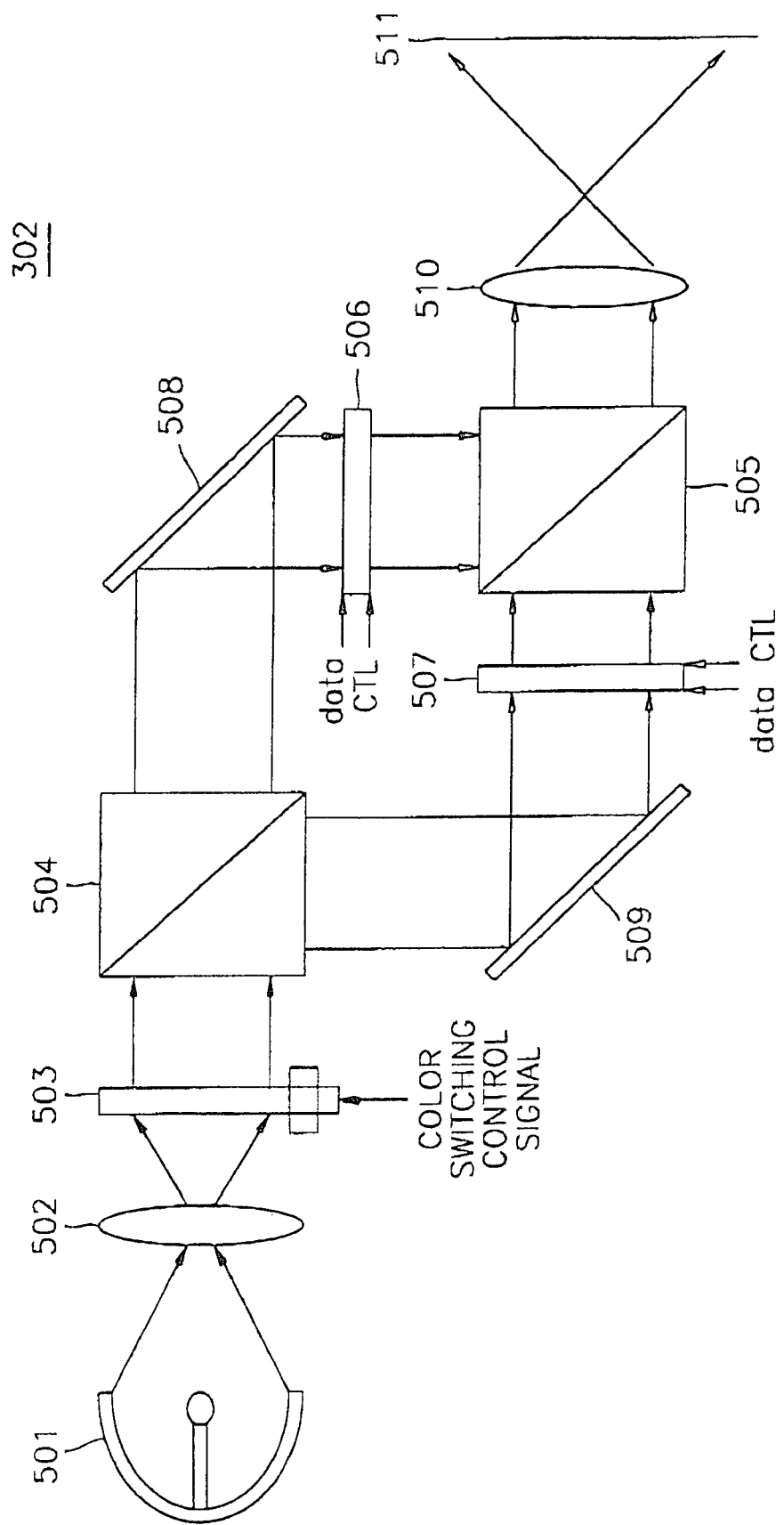
FIG. 5 is a detailed configuration of a first embodiment of the optical engine of FIG. 3, in accordance with the principles of the present invention.

The operation of the optical engine 302 will now be described with reference to FIG. 5. As shown in FIG. 5, the optical engine 302 includes an optical source 501, a collimating lens 502, a color switching means 503, first and second polarized beam splitters 504 and 505, first and second LCD panels 506 and 507, first and second reflective mirrors 508 and 509 and a projection lens 510.

The optical source 501 is made up of a lamp for producing light, and a reflective mirror for reflecting light emitted from the lamp to guide the light, and radiates light. The collimating lens 502 focuses light irradiated from the optical source 501 into parallel light or focusing light.

The color switching means 503 is an LCD shutter or a color wheel type, and receives white light from the collimating lense 502 and sequentially switches and outputs three colors R, G and B at intervals of ⅓ of a vertical period during one vertical period in accordance with a color switching control signal received from the controller 301. That is, during the first ⅓ vertical period, only the wavelength of R color among the received light is transmitted, while the remaining wavelengths are blocked. Then, the wavelengths of the colors G and B are sequentially switched and transmitted during the remaining two ⅓ vertical periods.

The first polarized beam splitter 504 transmits, for example, a P wave among light received from the color switching means 503, and reflects an S wave to change the travel direction of the S wave by 90 degrees. The first reflective mirror 508 reflects incident light transmitted by the first polarized beam splitter 504 and guides the reflected light to the first LCD panel 506 (LCD #1), and the second reflective mirror 509 reflects incident light reflected by the first polarized beam splitter 504 and guides the reflected light to the second LCD panel 507 (LCD #2).

The first LCD panel 506 is installed on the path of light reflected by the first reflective mirror 508, and transmits incident light corresponding to the data values of R, G and B applied by the controller 301 to the data lines of each cell formed as a matrix, according to a clock and panel control signal. That is, the first LCD panel 506 displays the R/G/B data received from the controller 301 each in a sequence starting from the most significant bit to the least significant bit, as shown in LCD #1 of FIG. 4.

The second LCD panel 507 is installed on the path of light reflected by the second reflective mirror 509, and transmits incident light corresponding to the data values of R, G and B applied to the data lines of each cell formed as a matrix, according to a clock and panel control signal, as in the first LCD panel 506. As shown in LCD #2 of FIG. 4, the second LCD panel 507 displays the Ro, Go and Bo data from the controller 301 each in a sequence starting from the least significant bit to the most significant bit, opposite to the LCD #1. That is, a false contour is removed by the bit arrangements made by the first and second LCD panels 506 and 507 in the opposite orders.

Hereinafter, the removal of false contour by the bit arrangements made by the first and second LCD panels 506 and 507 according to the present invention will be described by referring to only red data among the data R, G and B, for convenience of explanation.

If data is set to be composed of 5 bits, the first LCD panel 506 displays data in the order from MSB b4 to LSB b0, and the second LCD panel 507 displays data in the order from LSB b0 to MSB b4 which is opposite to the first LCD panel 506.

Consequently, when a data value of 15 is converted into a data value of 16, data is shown brightly with a data value of 31 in the first LCD (LCD #1) panel 506, and data becomes dark with a data value of 0 in the second LCD (LCD #2) panel 507, as shown in FIG. 7. Thus, a data value of 15.5, which is the average of the data values of the first and second LCD panels 506 and 507, is perceived by eyes, so that false contour is removed.

The second polarized beam splitter 505 transmits P wave light among light received from the first and second LCD panels 506 and 507, and reflects S wave light so that the travel direction of the S wave light from the first LCD panel 506 is consistent with that of the P wave light from the second LCD panel 507. The projection lens 510 magnifies and projects the light received from the polarized beam splitter 505 toward the screen 511.

The operation of a second embodiment of the optical engine 302 will now be described with reference to FIG. 6. The first embodiment of the optical engine 302 use transmissive LCD panels, but the second embodiment uses reflective ferroelectric liquid crystal (FLC) panels.

A transmissive LCD panel displays an image by transmitting incident light corresponding to a data value input to the data line of the transmissive LCD panel, and a reflective FLC panel displays an image by reflecting incident light corresponding to a data value input to the data line of the reflective FLC panel.

The second embodiment of the optical engine 302 includes an optical source 601, a collimating lense 602, a color switching unit 603, a polarized beam splitter 604, first and second FLC panels 605 and 606 and a projection lens 607.

The optical source 601 is made up of a lamp for producing light and a reflective mirror for reflecting light emitted from the lamp to guide the light, and radiates light. The collimating lens 602 focuses light irradiated from the optical source 601 into a parallel beam or focusing beam.

The color switching unit 603 is an LCD shutter or a color wheel type, and receives white color light from the collimating lense 602 and sequentially switches and outputs three colors R, G and B during one vertical period under the control of a color switching control signal received from the controller 301. That is, during a first ⅓ vertical period, only the wavelength of the color R among the received light is transmitted, while the remaining wavelengths are blocked. Then, the wavelengths of the colors G and B are sequentially switched and transmitted during the remaining two ⅓ vertical periods.

The polarized beam splitter 604 transmits, for example, P wave light among light received from the color switching unit 603 and guides the P wave light toward the second FLC panel 606, and reflects an S wave light to change the direction of travel of light by 90 degrees and guides the reflected S wave light toward the first FLC panel 605.

The first and second FLC panels 605 and 606 reflect the incident light beams corresponding to the R/G/B data values applied by the controller 301 to the data lines of each cell formed as a matrix, under the control of the clock and panel control signal, thereby displaying the image of each pixel. The first and second FLC panels 605 and 606 arrange bits in the opposite orders to remove a false contour, as shown in FIG. 4.

Then, the polarized beam splitter 604 transmits P wave light among light reflected by the first FLC panel 605, and reflects S wave light among light reflected by the second FLC panel 606 so that the travel path of the S wave light is consistent with that of the P wave light. The projection lens 607 magnifies the light received from the polarized beam splitter 604 and projects it toward the screen 608.

Figure 4:
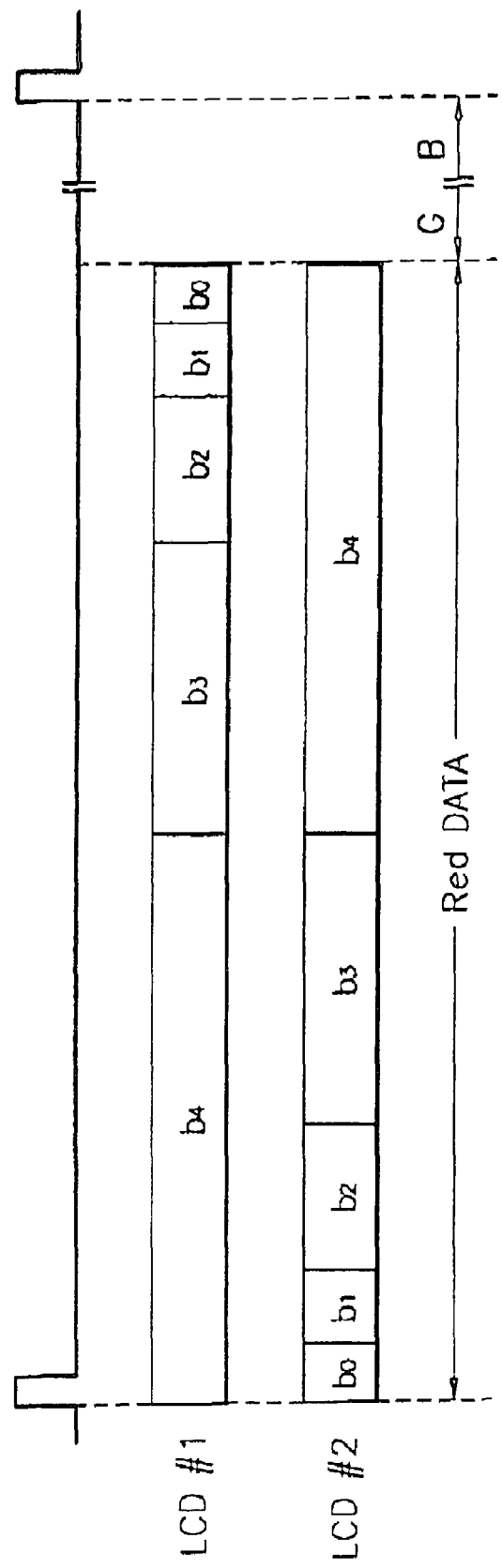
FIG. 4 shows the arrangement sequence of the bits of data on an LCD panel in a false contour correction method in an image display system, in accordance with the principles of the present invention.

Please refer now to FIG. 4. The FIG. 4 shows a timing diagram of a three color sequence (R then G then B) according to a method of compensating for false contour, in accordance with the principles of the present invention. FIG. 4 shows red (R) data in detail, which is followed by symbols G and B representing green data and blue data. In FIG. 4, the red data can have a minimum brightness level of 0 and a maximum brightness level of 31, because five bits are used for indicating the brightness level. The five bits are b4, b3, b2, b1, and b0. The minimum brightness level 0 exists when each one of the five bits is equal to zero, which is 00000. The maximum brightness level 31 exists when each one of the five bits is equal to one, which is 11111. The most significant bit is b4. The least significant bit is b0.

As shown in FIG. 4 for liquid crystal display panel #1 (LCD #1), the data bits are ordered so that the least significant bit b0 is output first, and the most significant bit b4 is output last. As shown in FIG. 4 for liquid crystal display panel #2 (LCD #2), the bits are ordered so that the most significant bit b4 is output first, and the least significant bit b0 is output last. The data bits are output from LCD#1 and from LCD#2 substantially simultaneously, and the two data streams are output to a screen substantially simultaneously, and the two data streams are viewed by a user substantially simultaneously. In this manner, a false contour phenomenon is reduced or removed.

Please refer now to FIG. 7. The FIG. 7 shows a correction of false contour, in accordance with the principles of the present invention. In FIG. 7, five bits are used for indicating a brightness level. The five bits are b4, b3, b2, b1, and b0. The most significant bit is b4. The least significant bit is b0.

In FIG. 7, a transition from brightness level 15 to brightness level 16 is illustrated, in accordance with the principles of the present invention. A brightness level of a pixel could transition from level 15 to level 16 at a certain moment while a movie was being shown on a high definition television (HDTV), for example.

Brightness level 15 is depicted in Frame 1 on FIG. 7. Brightness level 16 is depicted in Frame 2 on FIG. 7. Frame 1 is earlier in time than Frame 2. Frame 2 corresponds to a brightness level of a particular pixel after that particular pixel had a brightness level corresponding to Frame 1, for example. In FIG. 7, a ferroelectric liquid crystal display panel #1 (FLC #1) and a ferroelectric liquid crystal display panel #2 (FLC #2) are shown to be outputting data corresponding to brightness levels.

The FLC #1 of FIG. 7 is shown to be outputting data corresponding to a brightness level of 15 in Frame 1. The FLC #1 in Frame 1 is outputting five data bits b4=0, b3=1, b2=1, b1=1, and b0=1. The brightness level 15 corresponds to bit values 01111. After Frame 1, the Frame 2 is depicted. In Frame 2, the FLC #1 is shown to be outputting data corresponding to a brightness level of 16. In Frame 2 the FLC #1 is outputting five data bits b4=1, b3=0, b2=0, b1=0, and b0=0. The brightness level 16 corresponds to bit values 10000.

The FLC #2 of FIG. 7 is shown to be outputting data corresponding to a brightness level in an order where the bits are reversed from the order of FLC #1. The FLC #2 is shown to be outputting data corresponding to a brightness level of 15 in Frame 1, with the bits in reverse order. In Frame 1 the FLC #2 is outputting five data bits b4=0, b3=1, b2=1, b1=1, and b0=1. The brightness level 15 corresponds to bit values 01111. In Frame 1 for FLC #2, the bits are output in reverse order so that they are depicted as 11110. After Frame 1, the Frame 2 is depicted. In Frame 2, the FLC #2 is shown to be outputting data corresponding to a brightness level of 16 with the bits in reverse order. In Frame 2 the FLC #2 is outputting five data bits b4=1, b3=0, b2=0, b1=0, and b0=0. The brightness level 16 corresponds to bit values 10000. In Frame 2 for FLC #2, the bits are output in reverse order so that they are depicted as 00001.

In a device which does not utilize the apparatus and method of the present invention, there will be a problem when a brightness level changes from brightness level 15 to brightness level 16. The problem is known as false contour. Even though the change from level 15 to level 16 is a small change, an image will have a degraded quality on a device which does not utilize the apparatus and method of the present invention.

In a device which does not utilize the apparatus and method of the present invention, when a brightness level changes from level 15 (which corresponds to 01111) to level 16 (which corresponds to 10000), false contour will occur at the picture having a change from 15 brightness to 16 brightness, and the brightness level is changed to brightness level 31 or 0 at the interface between frames or fields. As a false contour, a white line or black picture appears on the screen.

However, in the present invention as shown in FIGS. 3–7, the false contour can be controlled regardless of the order of bit because FLC #1 and FLC #2 are arranged to output data bits in forward order and reverse order, respectively. FIG. 4 shows the horizontal line as a time domain. FIG. 7 shows the brightness level of R signal and indicates an example of 15 brightness and 16 brightness levels at which a bit reversion occurs between the first R (Frame 1) and the second R (Frame 2). In FIG. 7, the hatched or shaded areas correspond to bits having a value of 1 (one). In FIG. 7, the unshaded areas correspond to bits having a value of 0 (zero).

In a device which does not utilize the apparatus and method of the present invention, the brightness level can be changed to 31 at an interface between frames even though there is only one level between brightness level 15 and brightness level 16. That is the false contour phenomenon.

However, in the present invention as shown in FIGS. 3–7, when two panels are disposed to be in reverse order, the contour portion becomes 31 and 0 (zero). Therefore, an average brightness level of contour becomes (31+0)/2=15.5, and the contour is compensated smoothly.

In the specification, a digital display panel has been described by being limited to a transmissive LCD panel or reflective FLC panel, for convenience of explanation. However, it is apparent that the present invention can be applied to other types of digital display panels.

The above-described optical engines have been simplified for convenience of explanation. However, it is apparent to one of ordinary skill in the optical engine designing techniques that the optical engines can further include a glass polarizer, various shutters, cubes, and the like in order to improve the quality of image such as contrast, and that the location of collimating lenses can be changed.

According to the present invention as described above, received image data is displayed by reversely symmetrically arranging the bits of two digital driving display means, so that fatal false contour during digital driving can be removed.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An image display apparatus correcting false contour, comprising:
    a light unit emitting white light;
    a color switching unit receiving the white light from said first lens, receiving color switch signals, separating the white light into said plurality of colored lights, outputting each one of said plurality of colored lights seriatim in response to said color switch signals;
    a first lens collimating the lights received from said color switching unit;
    a first light beam splitter passing a first wave of said plurality of colored lights received and reflecting a second wave of said plurality of colored lights received;
    a first panel receiving said first wave of said plurality of colored lights, receiving color data and panel control signals and outputting first incident light corresponding to said received color data in accordance with said panel control signals to display said received color data starting from most significant bit to least significant bit; and
    a second panel receiving said second wave of said plurality of colored lights, receiving said color data and panel control signals and outputting second incident light corresponding to said received color data in accordance with said panel control signals to display said received color data starting from least significant bit to most significant bit.

2. The apparatus of claim 1, further comprising:
    a second light beam splitter receiving said first and second incident light from said first and second panels respectively, passing said second wave of said second incident light outputted by said second panel, reflecting said first wave of said first incident light outputted by said first panel; and
    a screen receiving said second wave of light passed by said second light beam splitter and said first wave of light reflected by said second light beam splitter.

3. The apparatus of claim 2, said color data and panel control signals received by said first panel corresponding to first color data and first panel control signals, said color data and panel control signals received by said second panel corresponding to second color data and second panel control signals distinguishable from said first color data and first panel control signals.

4. The apparatus of claim 2, further comprising a control unit receiving color signals and synchronization signals, outputting said color switch signals in accordance with said synchronization signals, outputting said color data corresponding to said received color signals, outputting said panel control signals.

5. The apparatus of claim 4, said control unit controlling offset, contrast, and brightness of the received color signals.

6. The apparatus of claim 4, said control unit performing signal processing on the received color signals including gamma correction.

7. The apparatus of claim 4, said control unit further comprising:
    a signal processing unit receiving said color signals, outputting said color data and said panel control signals; and
    a timing control unit receiving said synchronization signals, outputting said color switch signals.

8. The apparatus of claim 7, said synchronization signals corresponding to horizontal and vertical synchronization signals.

9. The apparatus of claim 2, further comprising:
    a first mirror reflecting said first wave received from said first light beam splitter, said first panel receiving said first wave reflected by said first mirror; and
    a second mirror reflecting said second wave received from said first light beam splitter, said second panel receiving said second wave reflected by said second mirror.

10. The apparatus of claim 2, said color switching unit outputting each one of said plurality of colored lights seriatim at intervals of ⅓ of a period in accordance with said color switch signals.

11. The apparatus of claim 10, said plurality of colored lights output from said color switching unit corresponding to red light, green light, and blue light.

12. The apparatus of claim 2, said color switching unit outputting a first colored light of said plurality of colored lights while blocking all other colored lights of said plurality of colored lights.

13. The apparatus of claim 2, said color data output from said control unit corresponding to first color data output to said first panel and second color data output to said second panel, said first and second color data being distinguishable from each other.

14. The apparatus of claim 2, said panel control signals output from said control unit corresponding to first panel control signals output to said first panel and second panel control signals output to said second panel, said first and second panel control signals being distinguishable from each other.

15. The apparatus of claim 2, said first and second panels corresponding to liquid crystal display panels.

16. The apparatus of claim 2, said color switching unit corresponding to one selected from among a liquid crystal display shutter and a color wheel.

17. An image display apparatus, comprising:
    a control unit receiving color signals and synchronization signals, outputting color switch signals in accordance with said synchronization signals, outputting color data corresponding to said received color signals, outputting panel control signals;
    a light unit emitting white light;
    a color switching unit receiving the white light from said light unit, receiving said color switch signals from said control unit, separating the white light into a plurality of colored lights, outputting each one of said plurality of colored lights seriatim in response to said color switch signals;

a first panel receiving P wave components of said plurality of colored lights outputted from said color switching unit, receiving said color data and panel control signals outputted by said control unit, outputting first incident light corresponding to said received color data applied by said control unit to data lines of each cell formed as a matrix in accordance with said panel control signals to display said received color data each of which starts from most significant bit to least significant bit; and a second panel receiving S wave components of said plurality of colored lights outputted from said color switching unit, receiving said color data and panel control signals outputted by said control unit, outputting second incident light corresponding to said received color data applied by said control unit to data lines of each cell formed as a matrix in accordance with said panel control signals to display said received color data each of which starts from least significant bit to most significant bit.

18. The apparatus of claim 17, further comprising:

a first lens collimating the white light received from said light unit, outputting the collimated white light to said color switching unit;

a first light beam splitter passing said P wave components, reflecting said S wave components;

a second light beam splitter receiving said first and second incident light from said first and second panels respectively, passing said S wave components of said second incident light outputted by said second panel, reflecting said P wave components of said first incident light outputted by said first panel; and a screen receiving and displaying light received from said second light beam splitter.

19. The apparatus of claim 18, said color switching unit outputting each one of said plurality of colored lights seriatim at intervals of ⅓ of a period in accordance with said color switch signals.

20. The apparatus of claim 18, said plurality of colored lights output from said color switching unit comprising red light, green light, and blue light.

21. The apparatus of claim 20, said color switching unit outputting one of said plurality of colored lights while blocking the others of said plurality of colored lights.

22. The apparatus of claim 18, said color switching unit outputting a first colored light of said plurality of colored lights while blocking all other colored lights of said plurality of colored lights.

23. The apparatus of claim 18, said color data output from said control unit corresponding to first color data output to said first panel and second color data output to said second panel, said first and second color data being distinguishable from each other.

24. The apparatus of claim 23, said panel control signals output from said control unit corresponding to first panel control signals output to said first panel and second panel control signals output to said second panel, said first and second panel control signals being distinguishable from each other.

25. The apparatus of claim 18, said panel control signals output from said control unit corresponding to first panel control signals output to said first panel and second panel control signals output to said second panel.

26. The apparatus of claim 18, said first and second panels corresponding to liquid crystal display panels.

27. The apparatus of claim 18, said color switching unit corresponding to one selected from among a liquid crystal display shutter and a color wheel.

28. An image display apparatus, comprising:

a light unit emitting light;

a color switching unit receiving the light from said light unit, receiving color switch signals, separating the light into a plurality of colored lights, outputting each one of said plurality of colored lights seriatim in response to said color switch signals;

a light beam splitter passing a first wave of said plurality of colored lights received from said color switching unit, reflecting a second wave of said plurality of colored lights received from said color switching unit;

a first panel receiving said first wave of said plurality of colored lights, receiving color data and panel control signals, reflecting first incident light corresponding to said received color data applied to data lines of each cell formed as a matrix in accordance with said panel control signals to display said received color data each of which starts from most significant bit to least significant bit;

a second panel receiving said second wave of said plurality of colored lights, receiving said color data and panel control signals, reflecting second incident light corresponding to said received color data applied to data lines of each cell formed as a matrix in accordance with said panel control signals to display said received color data each of which starts from least significant bit to most significant bit;

said light beam splitter receiving first and second reflected incident light from said first and second panels respectively, passing said first wave of said second incident light reflected by said second panel, reflecting said second wave of said first incident light reflected by said first panel; and a screen receiving said first wave of light passed by said light beam splitter and said second wave of light reflected by said light beam splitter.

29. The apparatus of claim 28, said color switching unit outputting each one of said plurality of colored lights seriatim in accordance with said color switch signals.

30. The apparatus of claim 28, said plurality of colored lights output from said color switching unit corresponding to red light, green light, and blue light.

31. The apparatus of claim 28, said color switching unit outputting a first colored light of said plurality of colored lights while blocking all other colored lights of said plurality of colored lights.

32. The apparatus of claim 28, said first and second panels corresponding to reflective ferroelectric liquid crystal panels.

33. The apparatus of claim 28, said color switching unit corresponding to one selected from among a color wheel and an electric shutter.

34. A method of displaying an image on an image display apparatus, comprising:

emitting light from a light unit;

receiving the light from said light unit and receiving color switch signals, separating the received light into a plurality of colored lights and outputting each one of said plurality of colored lights seriatim in accordance with said color switch signals, said separating being performed by a color switch unit;

passing a first wave of said plurality of colored lights outputted from said color switching unit and reflecting a second wave of said plurality of colored lights outputted from said color switching unit;

receiving said first wave of said plurality of colored lights, receiving first color data and first panel control signals, transmitting first incident light corresponding to said received first color data in accordance with said first panel control signals to display said received first color data each of which starts from most significant bit to least significant bit, said receiving of said first wave being performed by a first panel;

receiving said second wave of said plurality of colored lights, receiving second color data and second panel control signals, transmitting second incident light corresponding to said received second color data in accordance with said second panel control signals to display said received second color data each of which starts from least significant bit to most significant bit, said receiving of said second wave being performed by a second panel;

receiving first and second incident light from said first and second panels respectively, passing said second wave of said second incident light transmitted by said second panel, reflecting said first wave of said first incident light transmitted by said first panel; and receiving and displaying on a screen said second wave of said second incident light transmitted and said first wave of said first incident light reflected.

35. The method of claim 34, further comprising collimating the light received from said light unit and outputting the collimated light to said color switching unit.

36. The method of claim 34, said color switching unit outputting each one of said plurality of colored lights seriatim in accordance with said color switch signals.

37. The method of claim 36, said plurality of colored lights output from said color switching unit corresponding to red light, green light, and blue light.

38. The method of claim 34, said color switching unit outputting a first colored light of said plurality of colored lights while blocking all other colored lights of said plurality of colored lights.

39. The method of claim 38, said first and second panels being selected from among transmissive and reflective liquid crystal display panels.

40. The method of claim 39, said color switching unit corresponding to one selected from among a liquid crystal display shutter and a color wheel.

41. A false contour correction apparatus in an image display system driven in a digital system, the apparatus comprising:

a controller receiving a plurality of colored signals, performing a predetermined signal processing, and outputting color data in accordance with said signal processing; and an optical unit, comprising:

an optical source generating and irradiating light;

a collimating lens collimating light irradiated from said optical source;

a color switching unit receiving the light from said collimating lens and sequentially outputting optical signals;

a first polarized beam splitter splitting said outputted optical signals received from said color switching unit according to a polarization of said outputted optical signals, conveying P wave components of said outputted optical signals along said first light path, conveying S wave components of said outputted optical signals along said second light path;

said first display being installed along said first light path, arranging bits so that said outputted color data are displayed in order from most significant bit to least significant bit;

said second display being installed along said second light path, arranging bits so that said outputted color data are displayed in order from least significant bit to most significant bit; and a second polarized beam splitter splitting light received from said first and second displays according to a polarization of the light received from said first and second displays.

42. The apparatus of claim 41, said optical unit further comprising:

a first digital display panel receiving said outputted color data from said controller and panel control signals for driving said first digital display panel in accordance with first synchronization signals, said first display being located along said first light path; and a second digital display panel receiving said panel control signals and said outputted color data from said controller for driving said second digital display panel in accordance with second synchronization signals, said second display being located along said second light path, said first and second light paths being separately located.

43. The apparatus of claim 41, said sequentially outputted optical signals outputted from said color switching unit corresponding to red signals, green signals, and blue signals.

44. The apparatus of claim 41, said first and second displays being selected from among ferroelectric liquid crystal panels and liquid crystal display panels.

* * * * *